(12) United States Patent
Uppenkamp et al.

(10) Patent No.: US 12,399,055 B2
(45) Date of Patent: Aug. 26, 2025

(54) METHOD FOR OPERATING A VIBRONIC SENSOR

(71) Applicant: Endress+Hauser SE+Co. KG, Maulburg (DE)

(72) Inventors: Kaj Uppenkamp, Wehr (DE); Armin Wernet, Rheinfelden (DE); Christian Strittmatter, Rickenbach (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 281 days.

(21) Appl. No.: 18/248,539

(22) PCT Filed: Sep. 13, 2021

(86) PCT No.: PCT/EP2021/075124
§ 371 (c)(1),
(2) Date: Apr. 11, 2023

(87) PCT Pub. No.: WO2022/078684
PCT Pub. Date: Apr. 21, 2022

(65) Prior Publication Data
US 2023/0417591 A1      Dec. 28, 2023

(30) Foreign Application Priority Data

Oct. 14, 2020   (DE) ..................... 10 2020 127 077.1

(51) Int. Cl.
*G01F 23/296*      (2022.01)
(52) U.S. Cl.
CPC ............................... *G01F 23/2967* (2013.01)

(58) Field of Classification Search
CPC .. G01N 9/002; G01N 2009/006; G01F 34/80; G01F 34/2967; G01F 25/20; G01F 23/80; G01F 23/2967
See application file for complete search history.

(56) References Cited

U.S. PATENT DOCUMENTS 5,748,562 A * 5/1998 Cherek ............... G01F 23/2965
                                                      367/908
5,844,491 A * 12/1998 Getman .............. G01F 23/2967
                                                       73/290 V
(Continued)

FOREIGN PATENT DOCUMENTS

DE          3348119 C2    12/1989
DE         19720519 A1    11/1998
(Continued)

*Primary Examiner* — John Fitzgerald
(74) *Attorney, Agent, or Firm* — Mark A. Logan; Endress+Hauser (USA) Holding, Inc.

(57) ABSTRACT

A method for determining and/or monitoring a predeterminable fill level of a medium in a container using a vibronic sensor having at least one sensor unit with a mechanically vibratable unit, comprises exciting the mechanically vibratable unit with an excitation signal to produce mechanical vibrations, and receiving the mechanical vibrations in the form of a reception signal, determining an amplitude and a frequency of the reception signal, comparing the frequency and amplitude of the reception signal with a predeterminable frequency limit value and a predeterminable amplitude limit value, and determining a reaching of the predeterminable fill level on the basis of the comparison.

9 Claims, 3 Drawing Sheets

(56) References Cited

U.S. PATENT DOCUMENTS

| | | | | | |
|---|---|---|---|---|---|
| 5,895,848 | A | * | 4/1999 | Wilson | G01F 23/2967 73/290 R |
| 5,943,294 | A | * | 8/1999 | Cherek | G01S 7/526 367/908 |
| 6,236,322 | B1 | * | 5/2001 | Lopatin | G01F 23/2967 73/290 V |
| 6,389,891 | B1 | * | 5/2002 | D'Angelico | G01F 23/2961 73/304 R |
| 6,711,942 | B2 | * | 3/2004 | Getman | G01N 9/002 73/54.27 |
| 6,997,052 | B2 | * | 2/2006 | Woehrle | G01F 23/2967 73/290 R |
| 7,818,990 | B2 | * | 10/2010 | Brutschin | G01F 23/2966 73/1.73 |
| 8,869,597 | B2 | * | 10/2014 | Brengartner | G01F 23/2965 73/32 A |
| 8,919,192 | B2 | * | 12/2014 | Pfeiffer | G01N 11/167 73/32 A |
| 10,330,514 | B2 | * | 6/2019 | Lopatin | G01F 23/2967 |
| 10,365,194 | B2 | * | 7/2019 | Kerr | G01N 33/2823 |
| 11,740,116 | B2 | * | 8/2023 | D'Angelico | G01N 29/42 73/54.02 |
| 12,092,507 | B2 | * | 9/2024 | Uppenkamp | G01F 23/2967 |
| 2005/0210954 | A1 | | 9/2005 | Raffalt | |
| 2012/0085165 | A1 | * | 4/2012 | Hortenbach | G01F 23/2967 73/290 V |
| 2012/0279283 | A1 | * | 11/2012 | Brengartner | G01F 23/2967 73/861.351 |
| 2015/0047428 | A1 | * | 2/2015 | Lopatin | G01F 23/2967 73/290 V |
| 2017/0343459 | A1 | * | 11/2017 | Brengartner | G01N 9/002 |
| 2022/0082428 | A1 | * | 3/2022 | Zhang | G01F 23/22 |
| 2022/0221324 | A1 | * | 7/2022 | Uppenkamp | G01F 25/20 |
| 2023/0417591 | A1 | * | 12/2023 | Uppenkamp | G01F 23/2967 |

FOREIGN PATENT DOCUMENTS

| | | |
|---|---|---|
| DE | 10050299 A1 | 4/2002 |
| DE | 10057974 A1 | 5/2002 |
| DE | 10242970 A1 | 4/2004 |
| DE | 10328296 A1 | 1/2005 |
| DE | 102004036359 A1 | 11/2005 |
| DE | 102004055552 A1 | 5/2006 |
| DE | 102005009580 A1 | 9/2006 |
| DE | 102005015547 A1 | 10/2006 |
| DE | 102005036409 A1 | 2/2007 |
| DE | 102006033819 A1 | 1/2008 |
| DE | 102006034105 A1 | 1/2008 |
| DE | 102007013557 A1 | 2/2008 |
| DE | 102007008669 A1 | 8/2008 |
| DE | 102007043811 A1 | 3/2009 |
| DE | 102009026685 A1 | 12/2010 |
| DE | 102009028022 A1 | 2/2011 |
| DE | 102010028161 A1 | 10/2011 |
| DE | 102010030982 A1 | 1/2012 |
| DE | 102015102834 A1 | 9/2016 |
| DE | 102017102550 A1 | 8/2018 |
| DE | 102017111392 A1 | 11/2018 |
| DE | 102017112167 A1 | 12/2018 |
| DE | 102017126819 A1 | 5/2019 |

\* cited by examiner

METHOD FOR OPERATING A VIBRONIC SENSOR

CROSS-REFERENCE TO RELATED APPLICATIONS

The present application is related to and claims the priority benefit of DPMA Patent Application No. 10 2020 127 077.1, filed on Oct. 14, 2020, and International Patent Application No. PCT/EP2021/075124, filed Sep. 13, 2021, the entire contents of which are incorporated herein by reference.

TECHNICAL FIELD

The invention relates to a method for determining and/or monitoring a predeterminable fill level of a medium in a container by means of a vibronic sensor having at least one sensor unit with a mechanically vibratable unit. In addition to an, in particular predeterminable, fill level of a medium, vibronic sensors can also be used to determine the flow, the density, or the viscosity of the medium. The container is, for example, a tank or a pipeline.

BACKGROUND

Vibronic sensors are often used in process and/or automation engineering. In the case of fill level measuring devices, they have at least one mechanically vibratable unit such as, for example, a vibrating fork, a single rod, or a diaphragm. In operation, this is excited to produce mechanical vibrations by means of a drive/receiving unit, often in the form of an electromechanical transducer unit, which in turn can be a piezoelectric drive or an electromagnetic drive, for example.

A wide variety of corresponding field devices are made by the applicant and, in the case of fill level measuring devices, are distributed under the name LIQUIPHANT or SOLIPHANT, for example. The underlying measurement principles are known in principle from numerous publications. The drive/receiving unit excites the mechanically vibratable unit to induce mechanical vibrations by means of an electrical excitation signal. Conversely, the drive/receiving unit can receive the mechanical vibrations of the mechanically vibratable unit and convert same into an electrical reception signal. The drive/receiving unit is accordingly either a separate drive unit and a separate receiving unit, or a combined drive/receiving unit.

In many instances, the drive/receiving unit is thereby part of an electrical resonant feedback circuit by means of which the excitation of the mechanically vibratable unit to produce mechanical vibrations takes place. For example, the resonant circuit condition according to which the amplification factor is ≥1 and all phases occurring in the resonant circuit result in a multiple of 360° must be fulfilled for a resonant vibration.

To excite and fulfill the resonant circuit condition, a defined phase shift must be ensured between the excitation signal and the reception signal. A predeterminable value for the phase shift, thus a setpoint for the phase shift between the excitation signal and the reception signal, is therefore often set. For this purpose, a wide variety of solutions, both analog and digital methods, has become known from the prior art. In principle, the phase shift can be set, for example, by using a suitable filter, or else can be regulated by means of a control loop to a predeterminable phase shift, the setpoint value. For example, DE102006034105A1 discloses the use of an adjustable phase shifter. By contrast, the additional integration of an amplifier with an adjustable amplification factor for the additional control of the vibration amplitude was described in DE102007013557A1. DE102005015547A1 proposes the use of an all-pass filter. Adjustment of the phase shift is also possible by means of a so-called frequency search, as disclosed for example in DE102009026685A1, DE102009028022A1, and DE102010030982A1. However, the phase shift can also be regulated to a predeterminable value by means of a phase-locked loop (PLL). An excitation method based thereon forms the subject matter of DE102010030982A1.

Both the excitation signal and the reception signal are characterized by their frequency $\omega$, amplitude A, and/or phase $\phi$. Accordingly, changes in these variables are usually used to determine the process variable in question, such as a predetermined fill-level of a medium in a tank, or else the density and/or viscosity of a medium, or the flow of a medium through a pipe. In the case of a vibronic level switch for liquids, for example, a distinction is made between whether the vibratable unit is covered by the liquid or vibrates freely. The two states, the free state and the covered state, are thus differentiated—for example, based on different resonant frequencies, i.e., a frequency shift. The density and/or viscosity, in turn, can only be determined with such a measuring device if the vibratable unit is covered by the medium, as for example in documents DE10050299A1, DE102007043811A1, DE10057974A1, DE102006033819A1, or DE102015102834A1.

In order to ensure reliable operation of a vibronic sensor, numerous methods have also become known, with which state monitoring of the sensor can be carried out, as described, for example, in documents DE102005036409A1, or DE102007008669A1, DE102017111392A1 or DE102017102550A1.

The object of the present invention is to extend the field of application of vibronic sensors.

SUMMARY

This object is achieved according to the invention by a method for determining and/or monitoring a predeterminable fill level of a medium in a container by means of a vibronic sensor having at least one sensor unit with a mechanically vibratable unit, comprising the following method steps:

Exciting the mechanically vibratable unit by means of an excitation signal to produce mechanical vibrations, and receiving the mechanical vibrations in the form of a reception signal, Determining an amplitude and a frequency of the reception signal, Comparing the frequency and amplitude of the reception signal with a predeterminable frequency limit value and a predeterminable amplitude limit value, and Determining a reaching of the predeterminable fill level on the basis of the comparison.

According to the invention, a reference value is defined for the amplitude and for the frequency, by means of which reference value the amplitude and the frequency of the reception signal are compared in each case.

The consideration of the two variables amplitude and frequency results in extended possibilities of making statements with respect to the process variable. For example, a change in frequency or amplitude may be attributable to different causes. An additional consideration of the respective other characteristic variable makes it possible to distinguish between the different possible causes for the change. Numerous embodiments are possible in this connection, some particularly preferred variants of which are presented below:

In one embodiment, it is checked whether the frequency exceeds or falls below a predeterminable frequency limit value. In another embodiment it is similarly checked whether the amplitude exceeds or falls below a predeterminable amplitude limit value.

One embodiment includes the frequency and/or amplitude of the reception signal being recorded as a function of time. In this way, time developments of the sensor can be also observed. The method according to the invention thus furthermore advantageously makes it possible to carry out, in particular, predictive maintenance.

One embodiment of the method according to the invention includes that, in case the frequency changes, in particular in case the value exceeds or falls below the predeterminable frequency limit value while the amplitude remains substantially constant at the same time, this suggests that the vibratable unit is covered by a fluid. If only the frequency changes while the amplitude remains substantially constant, it is thus possible to conclude that the predeterminable fill level has been reached.

Another embodiment provides that, in case a change in amplitude occurs, in particular in case the value exceeds or falls below the predeterminable amplitude limit value, this suggests that the vibratable unit is covered by a foam or that a sediment is present in the medium. The present invention advantageously enables the detection of foams and sediments which usually cannot be detected or can be detected only with greater effort using conventional evaluation methods.

In this context, a deposition of sediment in the region of the vibratable unit is advantageously concluded in case that the frequency remains substantially constant. This is advantageous in particular if the vibronic sensor is used to determine a minimum limit level in a container. In this case, for example, sediment in the bottom area of the container can be detected which may falsify the statement made about the limit level. Having precise knowledge of the presence of sediment in the bottom area thus allows for a much more accurate determination of the limit level.

Alternatively, it is advantageous if in case of a change in frequency, wherein the value does in particular not exceed or fall below the predeterminable frequency limit value, one concludes the presence of a sediment in the medium or coverage by a foam. In contrast, a minor change in frequency where the value does not, however, exceed or fall below the frequency limit value, is an indicator of foam or sediment dissolved in the medium.

In one embodiment of the method, the amplitude reference value and/or the frequency reference value are each a value for the amplitude and/or the frequency, which value corresponds to a resonance vibration of the vibratable unit in the fundamental mode and in air. For example, these reference values can be determined during the production of the respective sensor and stored, for example, in a memory unit, in a database or on a data sheet. The reference values then correspond to the delivery state of the sensor. However, they can also be determined at the customer and after installation in the respective container. By individually determining the reference values for each sensor, one can directly counteract the usual variances of these values resulting from manufacturing tolerances.

Within the scope of the method according to the invention it is also advantageous if the mechanically vibratable unit is excited to produce mechanical resonance vibrations in the fundamental mode, wherein the reception signal represents the resonance vibrations of the vibratable unit in the fundamental mode.

Finally, another embodiment includes that the vibratable unit is a vibrating fork with a membrane and two vibrating rods attached to the membrane.

In summary, the present invention allows for a precise determination and/or monitoring of the predeterminable fill level by means of a vibronic sensor, which can be implemented very easily. As a result of the simultaneous consideration of frequency and amplitude, a more accurate determination of the process variable is possible, and a wide variety of negative influencing factors on process variable determination, such as for example the presence of foam or sediment, can be detected and their influence on the statement made can thus be eliminated.

BRIEF DESCRIPTION OF THE DRAWINGS

The present disclosure and its advantages are described in more detail with reference to the following figures. In the figures.

DETAILED DESCRIPTION

Figure 1:
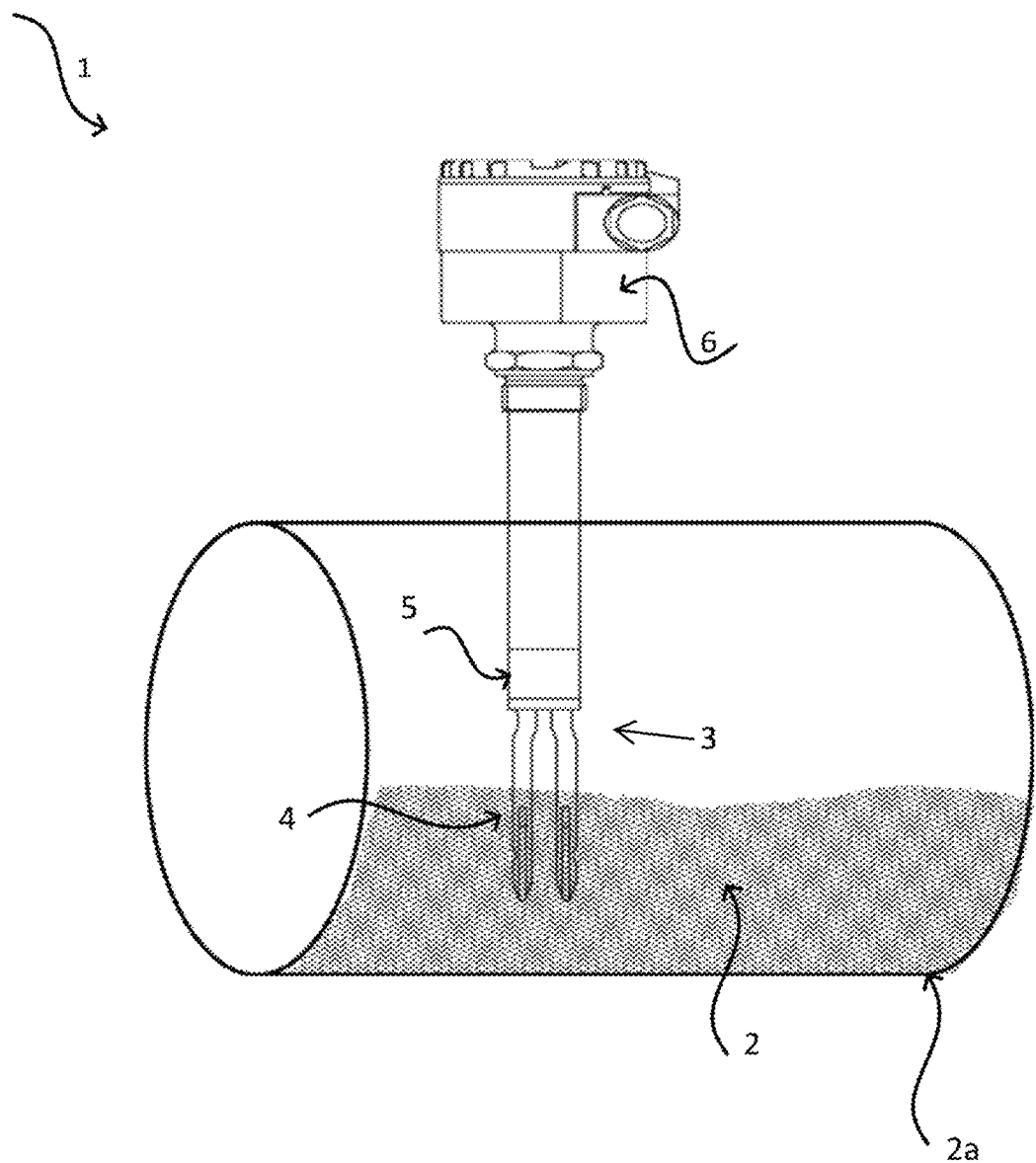
FIG. 1 shows a vibronic sensor according to the prior art.

FIG. 1 shows a vibronic sensor 1. A sensor unit 3 having a vibratable unit 4 is depicted in the form of a vibrating fork which is partially immersed in a medium 2, which is located in a tank 2a. Mechanical vibrations are excited in the vibratable unit 4 by the excitation/receiving unit 5, and the vibratable unit can, for example, be a piezoelectric stack drive or bimorph drive. However, it is naturally understood that other embodiments of a vibronic sensor also fall under the invention. Furthermore, an electronic unit 6 by means of which the signal detection, signal evaluation and/or signal supply takes place is shown.

Figure 2:
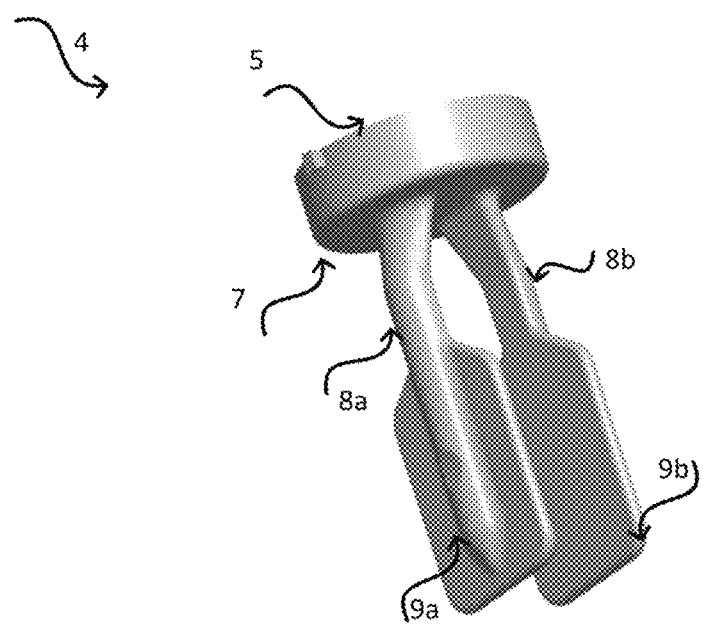
FIG. 2 shows a vibratable unit of a vibronic sensor in the form of a vibrating fork.

FIG. 2 shows a side view of a vibratable unit 4 in the form of a vibrating fork, as is integrated in the vibronic sensor 1 marketed by the applicant under the name LIQUIPHANT, for example. The vibrating fork 4 comprises two vibrating rods 8a,8b which are integrally formed on a membrane 7 and on the end of each of which a paddle 9a,9b is integrally formed. The vibrating rods 8a,8b together with the paddles 9a,9b are frequently also referred to as fork prongs. In order to mechanically vibrate the mechanically vibratable unit 4, a force is applied to the membrane 8 by means of a drive/receiving unit 5 which is firmly mounted on the side of the membrane 8 facing away from the vibrating rods 7a,7b. The drive/receiving unit 5 is an electromechanical transducer unit and comprises, for example, a piezoelectric element or also an electromagnetic drive [not shown]. The drive unit 5 and the receiving unit are constructed as two separate units or as a combined drive/receiving unit. In the case that the drive/receiving unit 5 comprises a piezoelectric element 9, the force applied to the membrane 7 is generated by applying an excitation signal UA for example in the form of an electrical AC voltage. A change in the applied electrical voltage causes a change in the geometric shape of the drive/receiving unit 5, i.e., a contraction or a relaxation within the piezoelectric element such that the application of an electrical AC voltage as excitation signal UA causes a vibration of the membrane 7 that is firmly bonded to the drive/receiving unit 5. Conversely, the mechanical vibrations of the vibratable unit are transmitted via the membrane to the drive/receiving unit 5 and converted into an electrical reception signal $U_E$. The predeterminable fill level of the medium 2 in the tank 2a can then be determined on the basis of the reception signal $U_E$, for example on the basis of an amplitude A, frequency f, or phase of the reception signal $U_E$.

The method according to the invention allows for a significantly higher accuracy in the determination of the predeterminable filling level in an expanded field of application. Various preferred embodiments are shown in this context by way of example in FIG. 3.

In a first step, reference values $f_{ref}, A_{ref}$ are determined for the amplitude and the frequency, wherein the vibratable unit 4 is excited to produce resonance vibrations in air. To determine a statement about the predeterminable fill level during continuous operation, the vibratable unit 4 is excited by means of an excitation signal UA to produce mechanical vibrations in the fundamental mode, and the reception signal $U_E$ representing the oscillations is received and evaluated with respect to the frequency f and amplitude A. The values f, A are compared to the respective reference values $f_{ref}, A_{ref}$ and, for example, a deviation of the measured values f, A from the reference values $f_{ref}, A_{ref}$ is determined or it is checked whether the frequency f and/or amplitude A exceeds or falls below the respectively predeterminable limit value $f_{ref}$ or $A_{ref}$.

Figure 3:
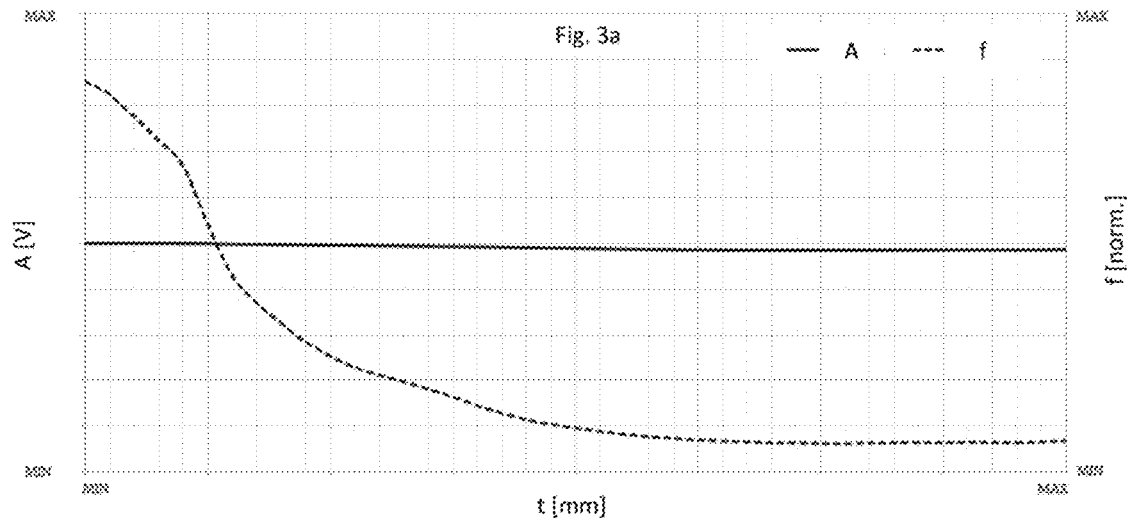
FIG. 3 shows diagrams of the frequency and amplitude for different media for illustrating the procedure according to the present disclosure.
Figure 3:
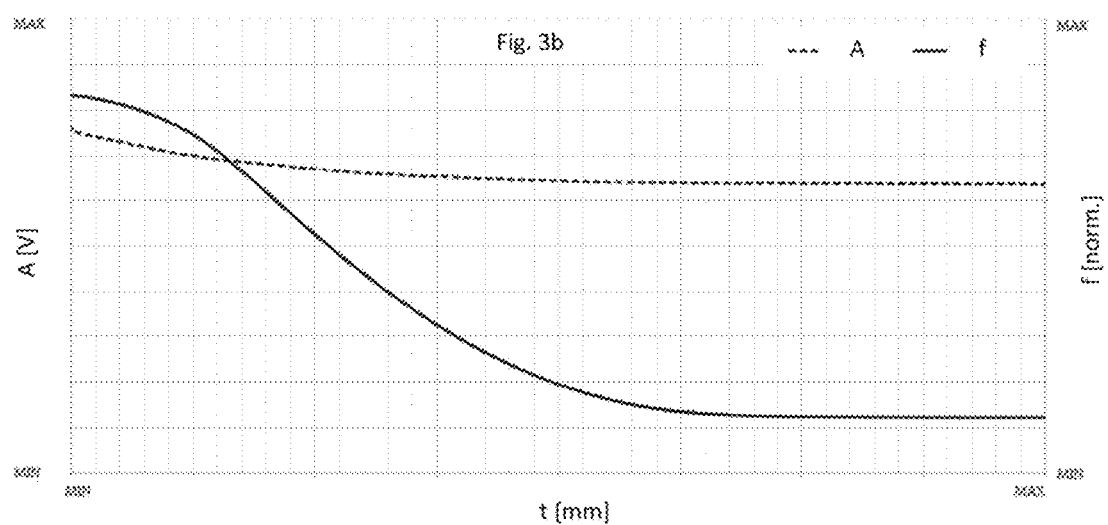

FIG. 3 shows exemplary diagrams of the frequency f and amplitude A in which, for different situations, the frequency f and amplitude A in each case is shown as a function of the immersion depth t of the vibratable unit 4 into the medium 2. In the case of coverage of the vibratable unit 4 with a liquid medium 2, the frequency f changes while the amplitude A remains substantially constant or changes only to a minor extent, as illustrated in FIG. 3a.

If, on the other hand, a change in amplitude A, in particular above a predeterminable amplitude limit value $A_{ref}$, can be detected, one can conclude that the vibrating unit 4 is covered by a foam or that a sediment is present in the medium, as illustrated in FIG. 3b. Without the additional consideration, it would be impossible to distinguish between a freely vibrating vibratable unit 4 and a coverage by foam or sediment. This can lead to considerable problems because the reaching of the predeterminable limit value may possibly not be correctly displayed.

Moreover, in order to be able to distinguish between a sediment and a foam, an additional consideration of the frequency f can be helpful for example in the presence of a change in amplitude A, as in the case of FIG. 3b. If the frequency f remains substantially constant, there may be, for example, a deposition of sediment in the region of the vibratable unit 4. If, on the other hand, a change in the frequency f is also detected which, however, does not exceed a predeterminable limit value for the frequency, for example, one may conclude that a sediment is present in the medium 2 or that the vibratable unit 4 is covered by a foam.

In addition to the possibilities mentioned, numerous further embodiments of the method according to the invention are conceivable, which allow for further conclusions to be drawn from the consideration of the frequency and amplitude with respect to the determination of a statement about the limit level, which also fall under the present invention.

The invention claimed is:

1. A method for determining and/or monitoring a predeterminable fill level of a medium in a container using a vibronic sensor having at least one sensor unit with a mechanically vibratable unit, the method comprising:
   exciting the mechanically vibratable unit with an excitation signal to produce mechanical vibrations;
   receiving mechanical vibrations in the form of a reception signal;
   determining an amplitude and a frequency of the reception signal;
   comparing the frequency and the amplitude of the reception signal with a predeterminable frequency limit value and a predeterminable amplitude limit value;
   determining a reaching of the predeterminable fill level on the basis of the comparison; and
   when the frequency of the reception signal exceeds or falls below the predeterminable frequency limit value while the amplitude of the reception signal remains constant, determining the vibratable unit is covered by a fluid.

2. The method according to claim 1,
   wherein the predeterminable amplitude limit value and/or the predeterminable frequency limit value are each a value for the amplitude and/or the frequency of the reception signal corresponding to a resonance vibration of the vibratable unit in the fundamental mode and in air.

3. The method according to claim 1,
   wherein the vibratable unit is a vibrating fork with a membrane and two vibrating rods attached to the membrane.

4. The method according to claim 1,
   wherein the comparing includes checking whether the frequency of the reception signal exceeds or falls below the predeterminable frequency limit value.

5. The method according to claim 1,
   wherein the comparing includes checking whether the amplitude of the reception signal exceeds or falls below the predeterminable amplitude limit value.

6. The method according to claim 1, further comprising:
   recording the frequency and/or amplitude of the reception signal a function of time.

7. A method for determining and/or monitoring a predeterminable fill level of a medium in a container using a vibronic sensor having at least one sensor unit with a mechanically vibratable unit, the method comprising:
   exciting the mechanically vibratable unit with an excitation signal to produce mechanical vibrations;
   receiving mechanical vibrations in the form of a reception signal;
   determining an amplitude and a frequency of the reception signal;
   comparing the frequency and the amplitude of the reception signal with a predeterminable frequency limit value and a predeterminable amplitude limit value;
   determining a reaching of the predeterminable fill level on the basis of the comparison; and
   when the amplitude of the reception signal exceeds or falls below the predeterminable amplitude limit value, determining the vibratable unit is covered by a foam or that a sediment is present in the medium.

8. The method according to claim 7, further comprising:
   when the frequency of the reception signal remains constant, determining a deposition of sediment in the region of the vibratable unit.

9. The method according to claim 7, further comprising:
when frequency of the reception signal changes but does not exceed or fall below the predeterminable frequency limit value, determining a presence of the sediment in the medium or coverage by the foam.

\* \* \* \* \*